(12) United States Patent
Hasebe et al.

(10) Patent No.: US 6,994,069 B2
(45) Date of Patent: Feb. 7, 2006

(54) HYDRAULIC CONTROL DEVICE FOR VALVE TRAINS OF ENGINE

(75) Inventors: Tetsuya Hasebe, Utsunomiya (JP); Tetsu Sugiyama, Utsunomiya (JP); Tomofumi Ikematsu, Utsunomiya (JP); Masao Kubodera, Shioya-gun (JP); Yusuke Tatara, Tokyo (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 21 days.

(21) Appl. No.: 10/441,217

(22) Filed: May 20, 2003

(65) Prior Publication Data

US 2003/0217728 A1 Nov. 27, 2003

(30) Foreign Application Priority Data

May 23, 2002 (JP) ............................. 2002-149729
Jun. 19, 2002 (JP) ............................. 2002-178837

(51) Int. Cl.
*F02D 17/02* (2006.01)
(52) U.S. Cl. ................................................ 123/198 F
(58) Field of Classification Search ............ 123/198 F, 123/90.16
See application file for complete search history.

(56) References Cited

U.S. PATENT DOCUMENTS

| 4,584,974 A | * | 4/1986 | Aoyama et al. | ......... | 123/90.16 |
| 5,592,907 A | * | 1/1997 | Hasebe et al. | ......... | 123/90.16 |
| 6,202,610 B1 | * | 3/2001 | Yoshiki et al. | ......... | 123/90.15 |
| 6,330,869 B1 | * | 12/2001 | Yoshiki et al. | ......... | 123/90.15 |
| 2002/0035986 A1 | * | 3/2002 | Takagi et al. | ................ | 123/481 |
| 2002/0115526 A1 | * | 8/2002 | Wakashiro et al. | ............ | 477/5 |

FOREIGN PATENT DOCUMENTS

| JP | 06-033720 | 2/1994 |
| JP | 06-033721 | 2/1994 |
| JP | 2002-115580 | 4/2002 |
| JP | 2002-201972 | 7/2002 |
| JP | 2002-357108 | 12/2002 |
| JP | 2002-364419 | 12/2002 |

OTHER PUBLICATIONS

Office Communication from the Japanese Patent Office dated Mar. 18, 2004 in Application No. 2002-149729 with English language translation.

* cited by examiner

*Primary Examiner*—Andrew M. Dolinar
*Assistant Examiner*—Katrina Harris
(74) *Attorney, Agent, or Firm*—Westerman, Hattori, Daniels and Adrian LLP (57) ABSTRACT

A hydraulic control device for valve trains of an engine having cylinders which are optionally deactivated by applying oil pressure to the valve train so as to suspend the operations of associated intake and exhaust valves, the hydraulic control device comprising a plurality of rocker shafts which are arranged in line, and each of which is provided with hydraulic passages therein for applying oil pressure to each of the valve trains so as to activate and deactivate the cylinders, a plurality of sets of hydraulic circuits, which are provided to the rocker shafts, respectively, for applying oil pressure to each of the rocker shafts, and oil pressure measuring sections provided to the hydraulic circuits, respectively, for measuring oil pressure in each of the hydraulic circuits.

8 Claims, 6 Drawing Sheets

HYDRAULIC CONTROL DEVICE FOR VALVE TRAINS OF ENGINE

BACKGROUND OF THE INVENTION

1. Field of the Invention

The present invention relates to a hydraulic control device for valve trains of an engine.

2. Description of the Related Art

Among hybrid vehicles, a type of hybrid vehicle is known in which a cylinder deactivation operation is executed, for example, by controlling valve trains of an engine using hydraulic control method in order to further improve fuel economy by means of reduction in friction of the engine. In this type of hybrid vehicle, when the vehicle enters in a deceleration state, a cylinder deactivation operation is executed along with a fuel cut operation so as to decrease engine friction, and as a result, the amount of regenerated electric energy is increased by an amount corresponding to the decreased engine friction, and thus fuel economy is improved.

Accordingly, if an engine is employed, in which an all-cylinder deactivation operation is made possible, energy, which would have been dissipated due to engine friction during a deceleration operation, can be recovered to the maximum, and thus a hybrid vehicle having excellent fuel economy can be obtained.

As described above, fuel economy can be greatly improved using an all-cylinder deactivation operation; however, in general, some of the cylinders must remain as normally activated cylinders so as to be able to drive the vehicle just in case a cylinder deactivation mechanism fails, and at the same time, a motor of the vehicle cannot drive the vehicle. Accordingly, friction due to the normally activated cylinders remain unchanged during a deceleration operation; therefore, fuel economy is not greatly improved.

SUMMARY OF THE INVENTION

Based on the above circumstances, an object of the present invention is to provide a hydraulic control device for valve trains which enables improvement in fuel economy due to a cylinder deactivation operation to the maximum, while also enabling drive of the vehicle even when some of the cylinders or a part of hydraulic system fail.

In order to achieve the above object, the present invention provides a hydraulic control device for valve trains of an engine having cylinders which are optionally deactivated by applying oil pressure to the valve trains so as to suspend the operations of associated intake and exhaust valves, the hydraulic control device comprising: a plurality of rocker shafts which are arranged in line, and each of which is provided with hydraulic passages therein for applying oil pressure to each of the valve trains so as to activate and deactivate the cylinders; a plurality of sets of hydraulic circuits which are provided to the rocker shafts, respectively, for applying oil pressure to each of the rocker shafts; and oil pressure measuring sections provided to the hydraulic circuits, respectively, for measuring oil pressure in each of the hydraulic circuits.

According to the hydraulic control device configured as described above, it is possible to apply oil pressure to each of the rocker shafts via the hydraulic circuits so as to suspend the operations of the intake and exhaust valves so that all of the cylinders are deactivated when, for example, fuel supply is suspended during deceleration run of the vehicle, while on the other hand, when failure of the hydraulic system is detected by the oil pressure measuring sections, it is also possible to apply oil pressure to the rocker shaft corresponding to the failed hydraulic system via the hydraulic circuits of the normally operating hydraulic system so as to normally operate the intake and exhaust valves combined with the valve trains.

The present invention also provides a hydraulic control device for valve trains of an engine installed in a hybrid vehicle which comprises a motor in addition to the engine as power sources, and in which the power of at least one of the engine and the motor is transmitted to an output shaft via a transmission for driving the hybrid vehicle, and the engine having cylinders which are optionally deactivated by applying oil pressure to the valve trains so as to suspend the operations of associated intake and exhaust valves, the hydraulic control device comprising: a plurality of rocker shafts which are arranged in line, and each of which is provided with hydraulic passages therein for applying oil pressure to each of the valve trains so as to activate and deactivate the cylinders; and oil pressure control sections which are connected to the rocker shafts, respectively, for applying oil pressure to each of the rocker shafts.

According to the hydraulic control device configured as described above, it is possible to apply oil pressure to each of the rocker shafts via the oil pressure control sections so as to suspend the operations of the intake and exhaust valves so that all of the cylinders are deactivated when, for example, fuel supply is suspended during deceleration run of the vehicle, while on the other hand, when one hydraulic system fails, it is also possible to apply oil pressure to the rocker shaft corresponding to the failed hydraulic system via the oil pressure control sections of the normally operating hydraulic system so as to normally operate the intake and exhaust valves combined with the valve trains.

In the above hydraulic control device for valve trains, the oil pressure control sections may be adapted such that when any of the oil pressure control sections fail, the remaining oil pressure control sections apply oil pressure to the rocker shafts corresponding to the failed oil pressure control sections.

According to the hydraulic control device configured as described above, it is possible to apply oil pressure to the rocker shafts corresponding to the failed oil pressure control sections using the remaining oil pressure control sections.

In the above hydraulic control device for valve trains, the oil pressure control sections may comprise spool valves and oil pressure sensors.

According to the hydraulic control device configured as described above, it is possible to execute a cylinder deactivation operation and to cancel the cylinder deactivation operation while monitoring whether or not the hydraulic systems have failed using the oil pressure sensors.

The present invention also provides a hydraulic control device for valve trains of an internal combustion engine, the hydraulic control device comprising: a first oil pressure switching section which performs switching operation by receiving switching signal; a second oil pressure switching section which performs switching operation by receiving switching signal; a first hydraulic passage for supplying oil pressure from the first oil pressure switching section to the valve trains; a first oil pressure sensor for measuring oil pressure in the first hydraulic passage; a second hydraulic passage for supplying oil pressure from the first oil pressure switching section to the valve trains; a third hydraulic passage, which branches off the second hydraulic passage, for supplying oil pressure to the second oil pressure switching section; a second oil pressure sensor for measuring oil pressure in the third hydraulic passage; and a check valve, which is provided in the third hydraulic passage, for prohibiting oil flow from the second oil pressure switching section to the valve trains.

According to the hydraulic control device configured as described above, when the operation mode of the valve trains is switched between a normal operation mode, in which oil pressure is applied to the first hydraulic passage by the first oil pressure switching section while the oil pressure in the second hydraulic passage is released so as to, for example, operate the internal combustion engine in an all-cylinder activation mode, and a special operation mode, in which oil pressure is applied to the second hydraulic passage by the first oil pressure switching section while the oil pressure in the first hydraulic passage is released so as to, for example, operate the internal combustion engine in an all-cylinder deactivation mode, it is possible to close the third hydraulic passage by the second oil pressure switching section so as to ensure oil flow from the second hydraulic passage to the valve trains in the special operation mode of the valve trains.

The present invention also provides a hydraulic control device for valve trains of an internal combustion engine, the hydraulic control device comprising: a first oil pressure passage for making the valve trains operate in a normal manner; a second oil pressure passage for making the valve trains operate in a special manner; a first oil pressure switching section which is adapted to connect the first hydraulic passage to a high pressure side while connecting the second hydraulic passage to a low pressure side when the valve trains operate in the normal manner, and to connect the second hydraulic passage to the high pressure side while connecting the first hydraulic passage to the low pressure side when the valve trains operate in the special manner; a third hydraulic passage branching off the second hydraulic passage; a second oil pressure switching section, which is connected to the third hydraulic passage, for prohibiting oil flow in the third hydraulic passage when the second hydraulic passage is connected to the high pressure side by the first oil pressure switching section; and a check valve, which is provided in the third hydraulic passage, for prohibiting oil flow from the second oil pressure switching section to the valve trains.

According to the hydraulic control device configured as described above, it is possible to switch the operation mode of the valve trains between a normal operation mode, in which the first hydraulic passage is connected to the high pressure side by the first oil pressure switching section while the second hydraulic passage is connected to the low pressure side so as to, for example, operate the internal combustion engine in an all-cylinder activation mode, and a special operation mode, in which the second hydraulic passage is connected to the high pressure side by the first oil pressure switching section while the first hydraulic passage is connected to the low pressure side so as to, for example, operate the internal combustion engine in an all-cylinder deactivation mode. In addition, in the special operation mode of the valve trains, it is also possible to close the third hydraulic passage by the second oil pressure switching section so as to ensure oil flow from the second hydraulic passage to the valve trains.

The special operation mode of the valve trains can be cancelled just by releasing the second hydraulic passage by the second oil pressure switching section via the third hydraulic passage.

The above hydraulic control device for valve trains may further comprise: a first oil pressure sensor, which is provided to the first hydraulic passage, for measuring oil pressure therein; and a second oil pressure sensor, which is provided to an hydraulic passage between the check valve provided in the third hydraulic passage and the second oil pressure switching section, for measuring oil pressure in the hydraulic passage.

According to the hydraulic control device configured as described above, it is possible to detect failure in the hydraulic control device in such a manner that the oil pressure in the first hydraulic passage is measured by the first oil pressure sensor, the oil pressure in the third hydraulic passage is measured by the second oil pressure sensor, and switching signals of the first and second oil pressure switching sections are monitored so as to detect abnormality in switching operations of the first and second oil pressure switching sections.

In the above hydraulic control device for valve trains, the low pressure side may be connected to a drain passage.

According to the hydraulic control device configured as described above, the low pressure side can be simply configured so as to open to the atmosphere.

In the above hydraulic control device for valve trains, an all-cylinder operation of the internal combustion engine may be executed, in which all cylinders thereof are activated by operating associated intake and exhaust valves, when the valve trains operate in the normal manner, and an all-cylinder deactivation operation of the internal combustion engine may be executed, in which all cylinders thereof are deactivated by suspending operations of the intake and exhaust valves when the valve trains operate in the special manner.

According to the hydraulic control device configured as described above, the operation mode of the engine can be switched between the all-cylinder activation mode and all-cylinder deactivation mode, and in case the operation mode of the engine cannot be switched from the all-cylinder deactivation mode into the all-cylinder activation mode, the oil pressure in the second hydraulic passage can be released by canceling prohibition of oil flow, due to the second oil pressure switching section, in the third hydraulic passage.

The above hydraulic control device for valve trains may further comprise a control section for respectively switching the first oil pressure switching section and the second oil pressure switching section, and in the hydraulic control device, failed state of the first oil pressure switching section or of the second oil pressure switching section may be determined based on switching signals being sent from the control section to the first oil pressure switching section and to the second oil pressure switching section, as well as based on the output signals of the first oil pressure sensor and the second oil pressure sensor.

According to the hydraulic control device configured as described above, failures in the first and second oil pressure switching sections can be detected. In particular, when it is detected that the first oil pressure switching section has failed, and the second hydraulic passage remains pressurized, the special operation of the valve trains can be terminated by canceling prohibition of oil flow in the third hydraulic passage using the second oil pressure switching section.

BRIEF DESCRIPTION OF THE DRAWINGS

FIGS. 3A and 3B show the variable valve timing mechanism used in the first embodiment of the present invention; in particular.

FIGS. 7A and 7B show the variable valve timing mechanism used in the first embodiment of the present invention; in particular.

DESCRIPTION OF THE PREFERRED EMBODIMENTS

The preferred embodiments of the present invention will be explained below with reference to the appended drawings.

The construction of a parallel hybrid vehicle, which comprises a hydraulic control device for valve trains according to a first embodiment of the present invention, will be explained below with reference to FIG. 1.

Figure 1:
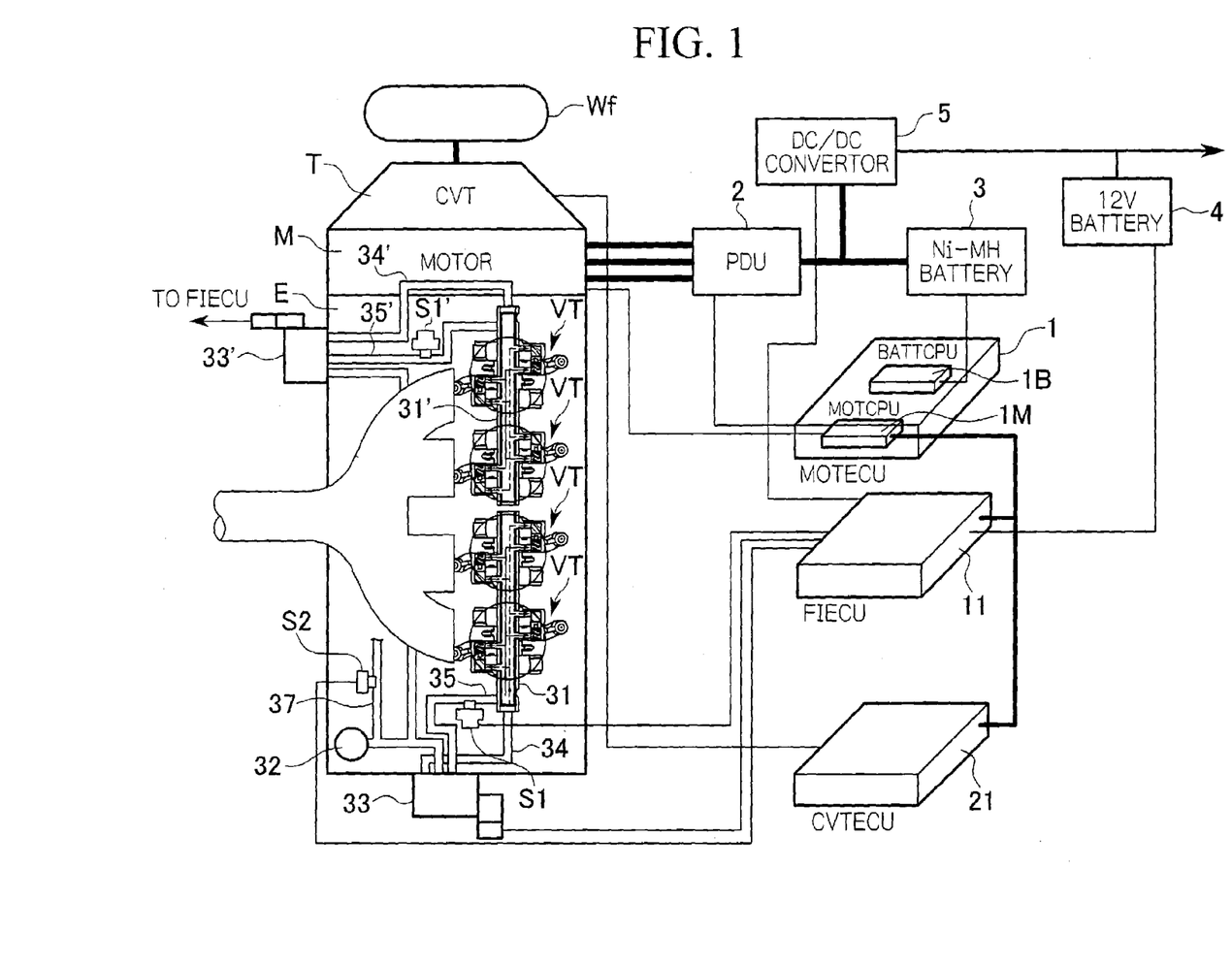
FIG. 1 is a block diagram showing the general structure of a hybrid vehicle in a first embodiment according to the present invention.

As shown in FIG. 1, the hybrid vehicle comprises an engine E, a motor M, and a transmission T, which are coupled to each other in series. The driving power generated by at least one of the engine E and the electric motor M is transmitted via, for example, a CVT (continuously variable transmission) as the transmission T (the transmission T may be a manual transmission) to front wheels Wf as driving wheels. When the driving power is transmitted from the driving wheels Wf to the motor M during deceleration of the hybrid vehicle, the motor M acts as a generator for applying a so-called regenerative braking force to the vehicle, i.e., the kinetic energy of the vehicle is recovered and stored as electric energy.

The driving of the motor M and the regenerating operation of the motor M are controlled by a power drive unit (PDU) 2 according to control commands from a motor CPU 1M of a motor ECU 1. A high-voltage nickel metal hydride battery 3 for sending and receiving electric energy to and from the motor M is connected to the power drive unit 2. The battery 3 includes a plurality of modules connected in series, and in each module, a plurality of cell units are connected in series. The hybrid vehicle includes a 12-volt auxiliary battery 4 for energizing various electrical accessories. The auxiliary battery 4 is connected to the battery 3 via a downverter 5 as a DC-DC converter. The downverter 5, which is controlled by an FIECU 11, makes the voltage from the battery 3 step-down and charges the auxiliary battery 4. Note that the motor ECU 1 comprises a battery CPU 1B for protecting the battery 3 and calculating the state of charge of the battery 3. In addition, a CVTECU 21 is connected to the transmission T, which is a CVT, for controlling the same.

The FIECU 11 controls, in addition to the motor ECU 1 and the downverter 5, a fuel injection valve (not shown) for controlling the amount of fuel supplied to the engine E, a starter motor, ignition timing, etc. To this end, the FIECU 11 receives various signals such as a signal from a speed sensor, a signal from an engine revolution rate sensor, a signal from a shift position sensor, a signal from a brake switch, a signal from a clutch switch, a signal from a throttle opening-degree sensor, and a signal from an intake negative pressure sensor (the sensors are not shown in the drawings). In addition, the FIECU 11 also receives signals from POIL sensors (oil pressure measuring section or oil pressure sensor) S1 and S1', signals from the solenoids of spool valves 33 and 33', and a TOIL sensor (oil temperature sensor) S2, which will be further explained below.

The engine E is of a four-cylinder SOHC type, and the engine E comprises two rocker shafts 31 and 31', each of which is allocated to two cylinders. Each of the cylinders is provided with a variable valve timing mechanism (i.e., a valve train) VT to which oil pressure is applied in order to activate and deactivate the cylinder. In addition, the spool valves 33 and 33' which operate with oil pressure from an oil pump 32, deactivation executing passages (hydraulic circuits) 34 and 34', deactivation canceling passages (hydraulic circuits) 35 and 35', and the POIL sensors S1 and S1' are connected to the rocker shafts 31 and 31', respectively. The spool valves 33 and 33', the deactivation executing passages 34 and 34', the deactivation canceling passages 35 and 35', and the POIL sensors S1 and S1' primarily form hydraulic control sections. Reference symbols 36 and 36' indicate oil supply passages connecting the pump 32 to the spool valves 33 and 33', respectively.

Thus, the operation mode of the engine E can be switched between the all-cylinder activation mode, in which all four cylinders associated with two rocker shafts 31 and 31' are activated by being controlled by the hydraulic control sections, respectively, and the all-cylinder deactivation mode, in which all four cylinders are deactivated. Moreover, even when the hydraulic system associated with one of the rocker shafts 31 and 31' fails, the cylinders associated with the other hydraulic system can be activated.

Next, the variable valve timing mechanism VT will be explained in detail with reference to FIGS. 2 to 4. Because the constructions of the hydraulic control sections associated with the rocker shafts 31 and 31' are the same, only the construction associated with the rocker shaft 31 will be explained below.

Figure 2:
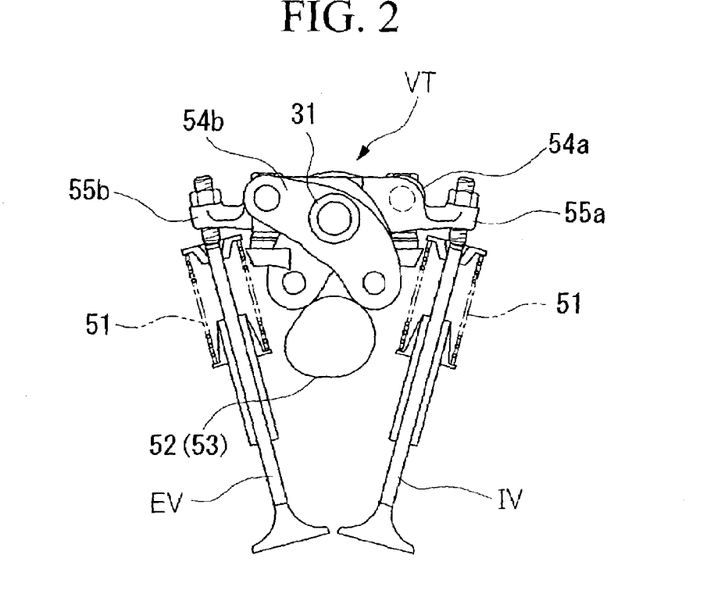
FIG. 2 is a front view showing a variable valve timing mechanism used in the first embodiment of the present invention.

As shown in FIG. 2, the cylinder (not shown) is provided with the intake valve IV and the exhaust valve EV which are biased by valve springs 51 and 51 in a direction which closes the intake port (not shown) and exhaust port (not shown), respectively. Reference symbol 52 indicates a lift cam provided on a camshaft 53. The lift cam 52 is engaged with an intake cam lifting rocker arm 54a for lifting the intake valve and an exhaust cam lifting rocker arm 54b for lifting the exhaust valve, both of which are rockably supported by the rocker shaft 31.

The rocker shaft 31 also supports valve operating rocker arms 55a and 55b in a rockable manner, which are located adjacent to the cam lifting rocker arms 54a and 54b, and whose rocking ends press the top ends of the intake valve IV and the exhaust valve EV, respectively, so that the intake valve IV and the exhaust valve EV open their respective ports. As shown in FIGS. 3A and 3B, the proximal ends (opposite the ends contacting the valves) of the valve operating rocker arms 55a and 55b are adapted so as to be able to engage a circular cam 531 provided on the camshaft 53.

Figure 3A:
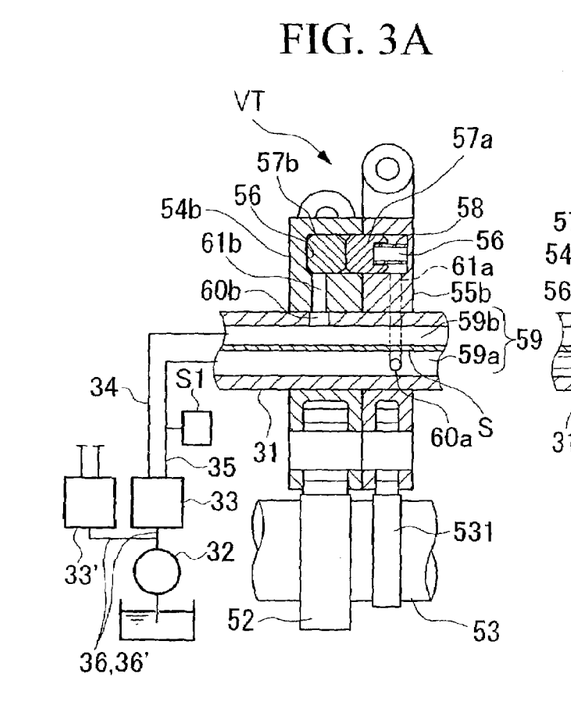
FIG. 3A shows a cross-section of the main part of the variable valve timing mechanism in an all-cylinder activation mode.
Figure 3B:
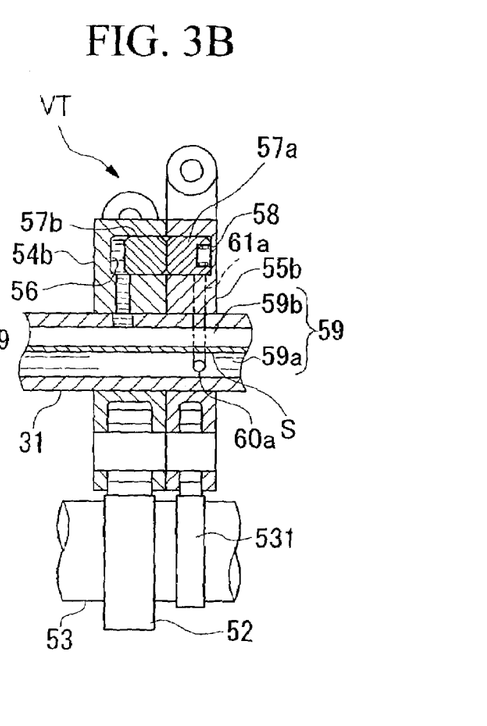
FIG. 3B shows a cross-section of the main part of the variable valve timing mechanism in an all-cylinder deactivation mode.

FIGS. 3A and 3B show, as an example, the cam lifting rocker arm 54b and the valve operating rocker arm 55b associated with the exhaust valve EV.

As shown in FIGS. 3A and 3B, a hydraulic chamber 56 is formed in the cam lifting rocker arm 54b and the valve operating rocker arm 55b in a continuous manner, which is located on the opposite side of the rocker shaft 31 with respect to the lift cam 52. The hydraulic chamber 56 is provided with a pin 57a and a disengaging pin 57b, both of which are made slidable and are biased toward the cam lifting rocker arm 54b by means of a pin spring 58.

The rocker shaft 31 has provided therein a hydraulic passage 59 which is divided into hydraulic passages 59a and 59b by a partition S. The hydraulic passage 59b is connected to the hydraulic chamber 56 at the position where the disengaging pin 57b is located via an opening 60b of the hydraulic passage 59b and a communication port 61b in the cam lifting rocker arm 54b. The hydraulic passage 59a is connected to the hydraulic chamber 56 at the position where the pin 57a is located via an opening 60a of the hydraulic passage 59a and a communication port 61a in the valve operating rocker arm 55b, and is adapted to be further connectable to a drain passage (not shown).

As shown in FIG. 3A, the pin 57a is positioned by the pin spring 58 so as to bridge the cam lifting rocker arm 54b and the valve operating rocker arm 55b when oil pressure is not applied via the hydraulic passage 59b. On the other hand, when oil pressure is applied via the hydraulic passage 59b in accordance with a cylinder deactivation signal, both of the pin 57a and the disengaging pin 57b slide toward the valve operating rocker arm 55b against the biasing force of the pin spring 58, and the interface between the pin 57a and the disengaging pin 57b corresponds to the interface between the cam lifting rocker arm 54b and the valve operating rocker arm 55b so as to disconnect these rocker arms 54b and 55b, as shown in FIG. 3B. The intake valve side is constructed in a similar manner. The hydraulic passages 59a and 59b are connected to an oil pump 32 via the spool valve 33 which is provided for ensuring oil pressure of the variable valve timing mechanisms VT.

Figure 4:
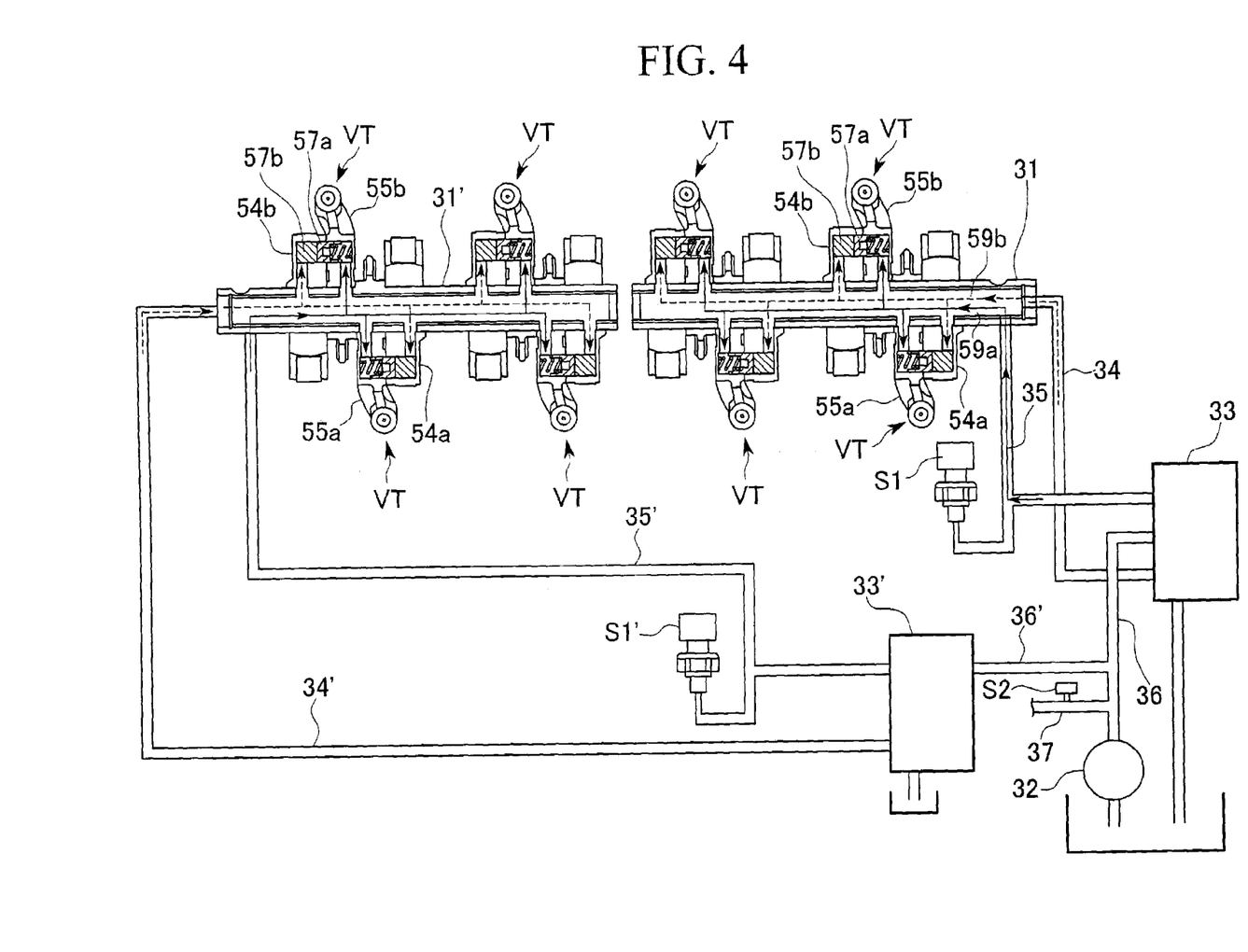
FIG. 4 is an enlarged view of the main part in FIG. 1.

As shown in FIG. 4, the deactivation executing passage 34 branching off the spool valve 33 is connected to the hydraulic passage 59b in the rocker shaft 31, and the deactivation canceling passage 35 branching off the spool valve 33 is connected to the hydraulic passage 59a. The deactivation canceling passage 35 is provided with the POIL sensor S1. The POIL sensor S1 monitors oil pressure in the deactivation canceling passage 35, which exhibits low pressure ("Low") in the deactivation mode, and which exhibits high pressure ("High") in the all-cylinder activation mode. The other spool valve 33' is connected to the oil supply passage 36' which branches off the oil supply passage 36 that connects the discharge port of the oil pump 32 to the spool valve 33, and which is provided to supply operation oil to the rocker shaft 31'. Another oil passage 37 branches off the oil supply passage 36 that is connected to the discharge port of the oil pump 32, which is provided to supply operation oil to the engine E, and which is provided with the TOIL sensor S2 that monitors the temperature of the operation oil being supplied to the engine E.

When, for example, fuel supply to the engine E is suspended during deceleration, and predetermined conditions for executing a cylinder deactivation operation are satisfied, the spool valves 33 and 33' respectively associated with the rocker shafts 31 and 31' are switched from the "Low" state corresponding to the all-cylinder activation mode into the "High" state corresponding to the all-cylinder deactivation mode upon receiving signals from the FIECU 11. As a result, operation oil pressurized by the oil pump 32 is supplied to the deactivation executing passages 34 and 34' via the oil supply passages 36 and 36' and the spool valves 33 and 33', respectively, and hydraulic pressure is applied to the hydraulic chamber 56 via the hydraulic passage 59b in both of intake valve and exhaust valve sides. On the other hand, at the same time, the deactivation canceling passages 35 and 35' are connected to the drain passage via the spool valves 33 and 33' so as to be under low pressures, which are detected by the POIL sensor S1 and S1' as the "Low" state. Subsequently, the pins 57a, which have been bridging the cam lifting rocker arms 54a and 54b and the valve operating rocker arms 55a and 55b together with the disengaging pin 57b, slide toward the valve operating rocker arms 55a and 55b, and the cam lifting rocker arms 54a and 54b and the valve operating rocker arms 55a and 55b are disconnected.

In this state, although the cam lifting rocker arms 54a and 54b are driven by the rotating lift cam 52, the movements are not transmitted to the valve operating rocker arms 55a and 55b which have been disconnected from the cam lifting rocker arms 54a and 54b. As a result, because the valve operating rocker arms 55a and 55b are not driven and the intake valve IV and the respective ports of the exhaust valve EV remain closed, the engine E runs in the all-cylinder deactivation mode.

Next, when the conditions for executing a cylinder deactivation operation are no longer satisfied, for example, when the driver presses the accelerator pedal of the vehicle, the spool valves 33 and 33' respectively associated with the rocker shafts 31 and 31' are switched from the "High" state corresponding to the all-cylinder deactivation mode into the "Low" state corresponding to the all-cylinder activation mode upon receiving signals from the FIECU 11. As a result, supply of operation oil from the oil pump 32 to the oil supply passage 36 is suspended, and the pressures in the deactivation canceling passages 35 and 35' become high, which are detected by the POIL sensor S1 and S1' as the "High" state.

Accordingly, the hydraulic chamber 56 is no longer provided with oil pressure, and the pins 57a and 57b, which have been slid toward the valve operating rocker arms 55a and 55b, are returned by the pin spring 58 so as to again bridge the cam lifting rocker arms 54a and 54b and the valve operating rocker arms 55a and 55b.

When the cam lifting rocker arms 54a and 54b are driven by the rotating lift cam 52 in this state, the valve operating rocker arms 55a and 55b for the intake and exhaust valves IV and EV so that the engine E runs in the all-cylinder activation mode.

Accordingly, energy loss due to engine friction in all of the cylinders may be minimized by executing the all-cylinder deactivation operation, and the amount of regenerated electrical energy can be increased by an amount corresponding to the decreased engine friction, and thus fuel economy can be improved.

When, for example, the POIL sensor S1' associated with the rocker shaft 31' continuously exhibits the "Low" state, i.e., when an abnormality is detected in the pressure in the spool valve 33', the spool valve 33 associated with the rocker shaft 31 may be controlled so that the cylinders corresponding to the rocker shaft 31 are not deactivated. Accordingly, even when the valve trains or the hydraulic system associated with one rocker shaft fail, the cylinders corresponding to the other rocker shaft can be normally operated.

TABLE 1 shows the operation states of the spool valves 33 and 33' (in the "High" state or "Low" state) and pressures ("High" or "Low") measured by the POIL sensor S1 and S1' respectively in the all-cylinder activation mode and in the all-cylinder deactivation mode.

TABLE 1

| Operation mode | Command sent to spool valve 33 | Command sent to spool valve 33' | Indication of POIL sensor S1 | Indication of POIL sensor S1' |
|---|---|---|---|---|
| All-cylinder activation mode | Low | Low | High | High |
| All-cylinder deactivation mode | High | High | Low | Low |

According to the first embodiment, when the engine E runs in the all-cylinder deactivation mode, more energy corresponding to engine friction of all cylinders may be recovered by the motor M, and thus improvement in fuel economy due to the cylinder deactivation operation may be maximized, while on the other hand, even when some of the cylinders or a part of the hydraulic systems fail, the vehicle can continue running without problems, and thus reliability of the vehicle is enhanced.

Moreover, because the cylinder deactivation operation is executed and cancelled while monitoring whether or not the hydraulic system has failed by measuring oil pressure using the POIL sensors S1 and S1', the cylinder deactivation operation can be reliably executed and cancelled.

Next, the construction of a parallel hybrid vehicle, which comprises a hydraulic control device for valve trains according to a second embodiment of the present invention, will be explained below with reference to FIG. 5. Note that, in the following description referring to FIGS. 5 to 8, the same reference symbols will be applied to the elements which are common to both first and second embodiments, and detailed explanations thereof will be omitted.

Figure 5:
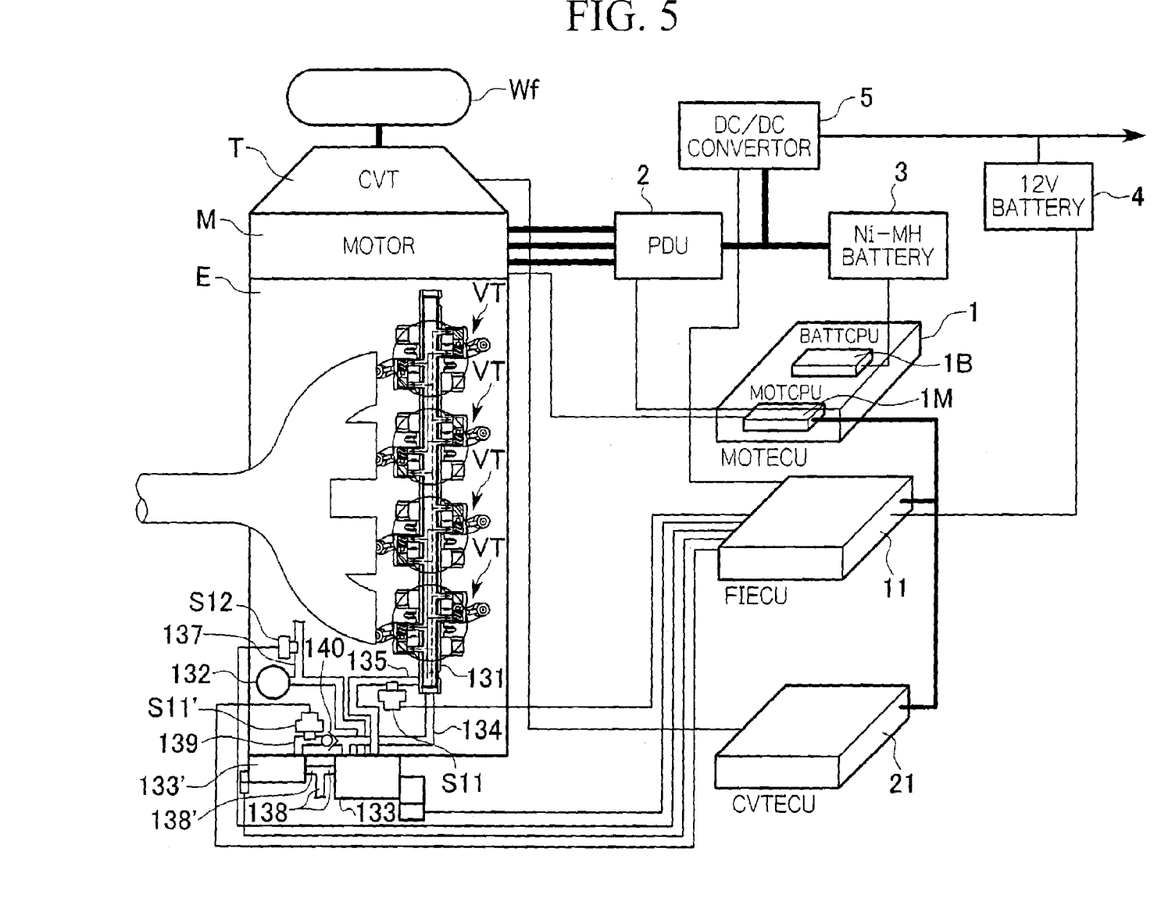
FIG. 5 is a block diagram showing the general structure of a hybrid vehicle in a first embodiment according to the present invention.

As shown in FIG. 5, the basic construction of the hybrid vehicle illustrated in FIG. 5 is the same as that of the hybrid vehicle illustrated in FIG. 1.

The FIECU 11 controls, in addition to the motor ECU 1 and the downverter 5, a fuel injection valve (not shown) for controlling the amount of fuel supplied to the engine E, a starter motor, ignition timing, etc. To this end, the FIECU 11 receives various signals such as a signal from a speed sensor, a signal from an engine revolution rate sensor, a signal from a shift position sensor, a signal from a brake switch, a signal from a clutch switch, a signal from a throttle opening-degree sensor, and a signal from an intake negative pressure sensor (the sensors are not shown in the drawings). In addition, the FIECU 11 also receives signals from POIL sensors (first and second oil pressure sensors) S11 and S11', signals from the solenoids of spool valves (first and second oil pressure switching sections) 133 and 133', and a TOIL sensor S12, which will be further explained below.

Figure 8:
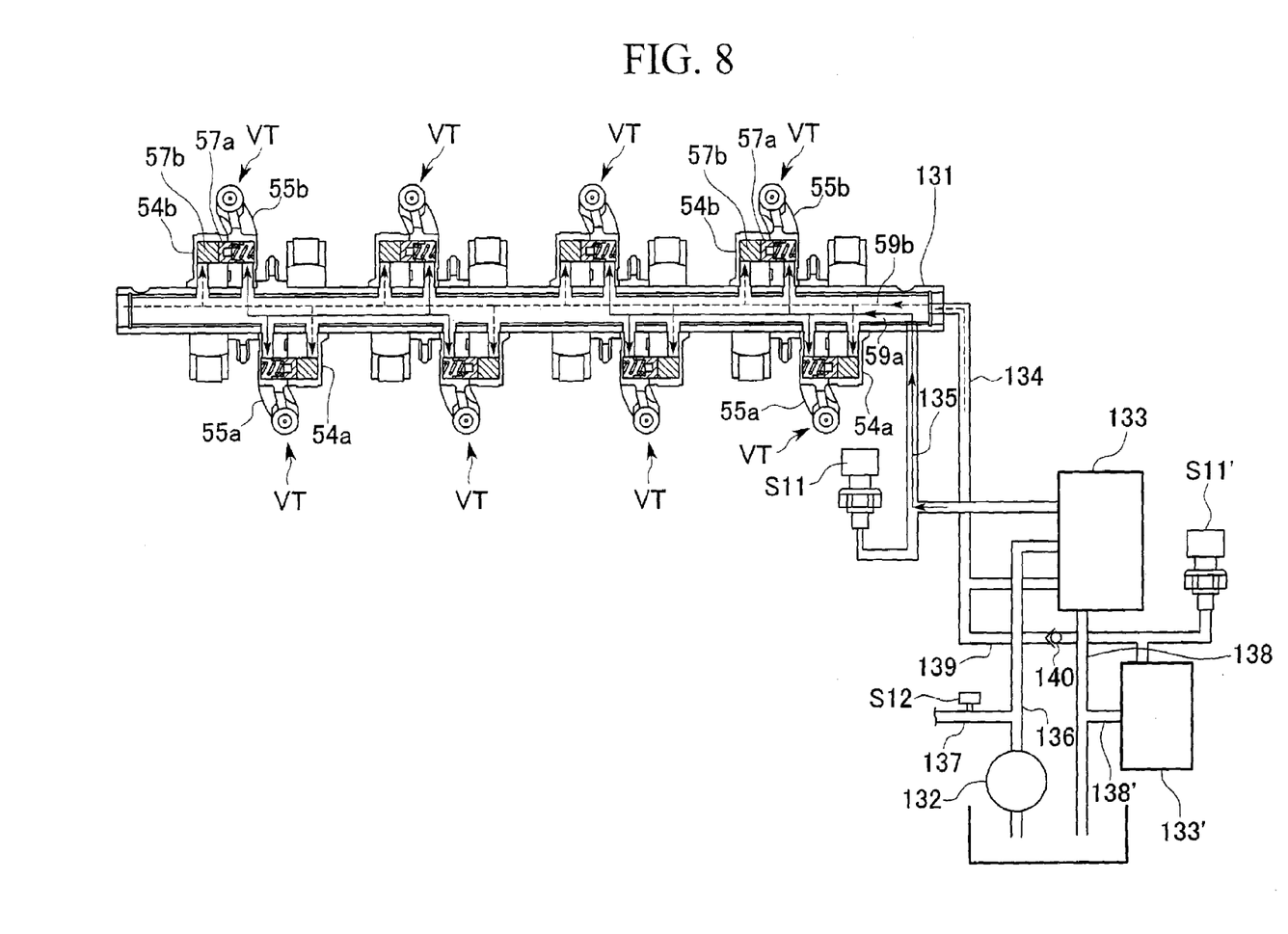
FIG. 8 is an enlarged view of the main part in FIG. 5.

The engine E is of a four-cylinder SOHC type, and each of the cylinders thereof is provided with a variable valve timing mechanism (i.e., a valve train) VT to which oil pressure is applied in order to activate and deactivate the cylinder. As shown in FIG. 8, the engine E in the second embodiment comprises single rocker shaft 131 instead of two rocker shaft 31 and 31' in the first embodiment.

Next, the variable valve timing mechanism VT will be explained in detail with reference to FIGS. 6 to 8.

Figure 6:
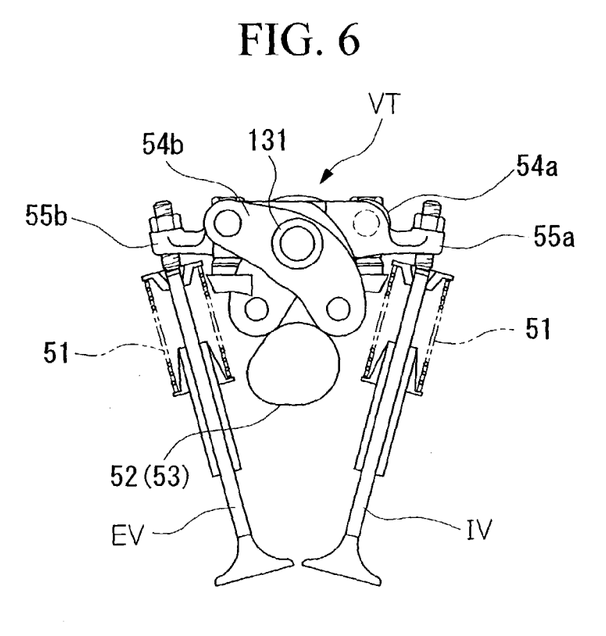
FIG. 6 is a front view showing a variable valve timing mechanism used in the first embodiment of the present invention.

As shown in FIG. 6, the basic construction around intake and exhaust valves IV and EV in the second embodiment is almost the same as that in the first embodiment except that the single rocker shaft 131 is provided.

The rocker shaft 131 has provided therein a hydraulic passage 59 which is divided into hydraulic passages 59a and 59b by a partition S. The hydraulic passage 59b is connected to the hydraulic chamber 56 at the position where the disengaging pin 57b is located via an opening 60b of the hydraulic passage 59b and a communication port 61b in the cam lifting rocker arm 54b. The hydraulic passage 59a is connected to the hydraulic chamber 56 at the position where the pin 57a is located via an opening 60a of the hydraulic passage 59a and a communication port 61a in the valve operating rocker arm 55b, and is adapted to be further connectable to a drain passage 138 that will be further explained below.

Figure 7A:
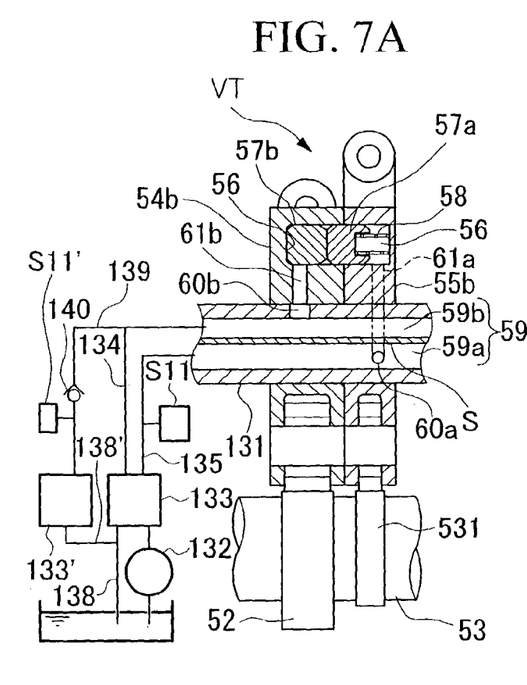
FIG. 7A shows a cross-section of the main part of the variable valve timing mechanism in an all-cylinder activation mode.
Figure 7B:
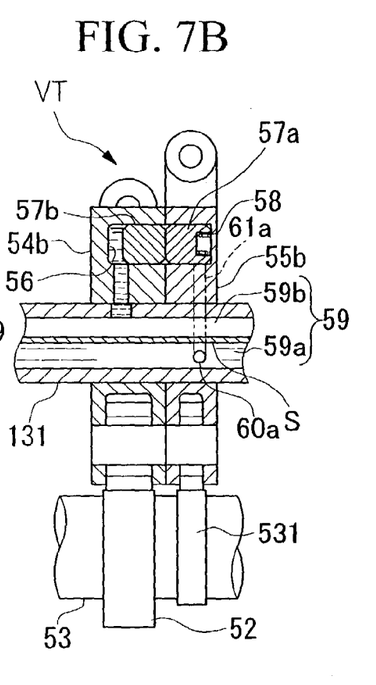
FIG. 7B shows a cross-section of the main part of the variable valve timing mechanism in an all-cylinder deactivation mode.

As shown in FIG. 7A, the pin 57a is positioned by the pin spring 58 so as to bridge the cam lifting rocker arm 54b and the valve operating rocker arm 55b when oil pressure is not applied via the hydraulic passage 59b. On the other hand, when oil pressure is applied via the hydraulic passage 59b in accordance with a cylinder deactivation signal, both of the pin 57a and the disengaging pin 57b slide toward the valve operating rocker arm 55b against the biasing force of the pin spring 58, and the interface between the pin 57a and the disengaging pin 57b corresponds to the interface between the cam lifting rocker arm 54b and the valve operating rocker arm 55b so as to disconnect these rocker arms 54b and 55b, as shown in FIG. 7B. The intake valve side is constructed in a similar manner. The hydraulic passages 59a and 59b are connected to an oil pump 132 via the spool valve 133 which is provided for ensuring oil pressure of the variable valve timing mechanisms VT.

As shown in FIG. 8, the spool valve 133 acts to switch discharging ports by the operation of the associated solenoid upon receiving switching signals from the FIECU 11. To the spool valve 133, an oil supply passage 136 connected to the discharge port of the oil pump 132 is connected as well as the drain passage 138. Moreover, to the spool valve 133, a deactivation canceling passage 135 (first hydraulic passage), which is provided for making the variable valve timing mechanisms VT operate in a normal manner so as to operate the engine E in an all-cylinder activation mode, and a deactivation executing passage 134 (second hydraulic passage), which is provided for making the variable valve timing mechanisms VT operate in a special manner so as to operate the engine E in an all-cylinder deactivation mode, are connected.

The deactivation canceling passage 135 is connected to the hydraulic passage 59a in the rocker shaft 131, and the deactivation executing passage 134 is connected to the hydraulic passage 59b in the rocker shaft 131.

Upon receiving a switching signal (OFF signal) from the FIECU 11 in order to operate the engine E in an all-cylinder activation mode, the spool valve 133 operates in such a manner that the high pressure port of the spool valve 133 is connected to the deactivation canceling passage 135 so as to apply oil pressure from the oil pump 132 to the deactivation canceling passage 135, and the low pressure port of the spool valve 133 is connected to the deactivation executing passage 134 so as to connect the deactivation executing passage 134 to the drain passage 138 ("Low side switching"). On the other hand, upon receiving another switching signal (ON signal) from the FIECU 11 in order to operate the engine E in an all-cylinder deactivation mode, the spool valve 133 operates in such a manner that the high pressure port of the spool valve 133 is connected to the deactivation executing passage 134 so as to apply oil pressure from the oil pump 132 to the deactivation executing passage 134, and the low pressure port of the spool valve 133 is connected to the deactivation canceling passage 135 so as to connect the deactivation canceling passage 135 to the drain passage 138 ("High side switching").

The deactivation canceling passage 135 is provided with the POIL sensor S11. The POIL sensor S11 monitors oil pressure in the deactivation canceling passage 135, which exhibits low pressure ("Low") in the deactivation mode, and which exhibits high pressure ("High") in the all-cylinder activation mode.

Another hydraulic control passage (third hydraulic passage) 139 branches off the deactivation executing passage 134, and the spool valve 133' is connected to the hydraulic control passage 139. A drain passage 138' is connected to the spool valve 133', as well as to the drain passage 138 of the spool valve 133.

The spool valve 133' operates in such a manner that, when the spool valve 133 is in the "High" state in which the deactivation executing passage 134 is connected to high pressure side, the spool valve 133' blocks the hydraulic control passage 139 ("High side switching"), and when the spool valve 133 is switched into the "Low" state in which the deactivation canceling passage 135 is connected to high pressure side, the spool valve 133' the hydraulic control passage 139 to the drain passage 138' ("Low side switching").

In the hydraulic control passage 139, there is provided a check valve 140 for prohibiting oil flow from the spool valve 133' to the variable valve timing mechanisms VT, i.e., to the deactivation executing passage 134. In addition, a POIL sensor S11' is provided to the hydraulic control passage 139 between the check valve 140 and the spool valve 133' so as to measure oil pressure at the position. The POIL sensor S11' monitors oil pressure in the hydraulic control passage 139, in which high pressure ("High") is exhibited up to the check valve 140 in the deactivation mode, and low pressure ("Low") is exhibited in the entirety of the hydraulic control passage 139 in the all-cylinder activation mode. Another oil passage 137 for supplying operation oil to the engine E is connected to the discharge port of the oil pump 132. The oil passage 137 is provided with a TOIL sensor S2 for monitoring the temperature of operation oil being supplied to the engine E.

When, for example, predetermined conditions for executing a cylinder deactivation operation are satisfied, the FIECU 11 sends an "ON signal" to the spool valves 133 and 133'. Upon receiving the "ON signal", the spool valve 133 is switched from the "Low" state corresponding to the all-cylinder activation mode into the "High" state corresponding to the all-cylinder deactivation mode, and the spool valve 133' is also switched from the "Low" state into the "High" state so as to block the drain passage 138'. As a result, operation oil pressurized by the oil pump 132 is supplied to the deactivation executing passage 134 via the oil supply passages 136 and the spool valve 133. Because oil flow through the spool valve 133' to the drain passage 138' is blocked, oil pressure is applied to the hydraulic chambers 56 in the cam lifting rocker arms 54a and 54b via the hydraulic passage 59b in both the intake valve and exhaust valve sides. On the other hand, at the same time, the deactivation canceling passage 135 is connected to the drain passage 138 so as to be under low pressure.

Accordingly, the POIL sensor S11 indicates "Low" pressure, and the POIL sensor S11' indicates "High" pressure.

Subsequently, the pins 57a, which have been bridging the cam lifting rocker arms 54a and 54b and the valve operating rocker arms 55a and 55b together with the disengaging pin 57b, slide toward the valve operating rocker arms 55a and 55b, and the cam lifting rocker arms 54a and 54b and the valve operating rocker arms 55a and 55b are disconnected.

In this state, although the cam lifting rocker arms 54a and 54b are driven by the rotating lift cam 52, the movements are not transmitted to the valve operating rocker arms 55a and 55b which have been disconnected from the cam lifting rocker arms 54a and 54b. As a result, because the valve operating rocker arms 55a and 55b are not driven and the intake valve IV and the respective ports of the exhaust valve EV remain closed, the engine E runs in the all-cylinder deactivation mode.

Next, when the conditions for executing a cylinder deactivation operation are no longer satisfied, for example, when the driver presses the accelerator pedal of the vehicle, the FIECU 11 sends an "OFF signal" to the spool valves 133 and 133'. Upon receiving the "OFF signal", the spool valve 133 is switched from the "High" state corresponding to the all-cylinder deactivation mode into the "Low" state corresponding to the all-cylinder activation mode, and the spool valve 133' is also switched from the "High" state into the "Low" state so as to open the drain passage 138'. As a result, operation oil pressurized by the oil pump 132 is supplied to the deactivation canceling passage 135 via the oil supply passages 136 and the spool valve 133, and thus the deactivation canceling passage 135 is under high pressure. On the other hand, the deactivation executing passage 134 is connected to the drain passages 138 and 138' via the spool valve 133', and thus the deactivation executing passage 134 is under low pressure. At this time, the POIL sensor S11 indicates "High" pressure, and the POIL sensor S11' indicates "Low" pressure.

Accordingly, oil pressure is applied to the hydraulic chamber 56 near the valve operating rocker arms 55a and 55b from the deactivation canceling passage 135, and the pins 57a and 57b, which have been slid toward the valve operating rocker arms 55a and 55b, are returned by oil pressure along with returning force of the pin spring 58 so as to again bridge the cam lifting rocker arms 54a and 54b and the valve operating rocker arms 55a and 55b.

When the cam lifting rocker arms 54a and 54b are driven by the rotating lift cam 52 in this state, the valve operating rocker arms 55a and 55b for the intake and exhaust valves IV and EV so that the engine E runs in the all-cylinder activation mode.

Accordingly, energy loss due to engine friction in all of the cylinders may be minimized by executing the all-cylinder deactivation operation, and the amount of regenerated electrical energy can be increased by an amount corresponding to the decreased engine friction, and thus fuel economy can be improved.

TABLE 2 shows the operation states of the spool valves 133 and 133' (in the "High" state or "Low" state) and pressures ("High" or "Low") measured by the POIL sensor S11 and S11' respectively in the all-cylinder activation mode and in the all-cylinder deactivation mode.

TABLE 2

| Operation mode | Command sent to spool valve 133 | Command sent to spool valve 133' | Indication of POIL sensor S11 | Indication of POIL sensor S11' |
|---|---|---|---|---|
| All-cylinder activation mode | Low | Low | High | High |

TABLE 2-continued

| Operation mode | Command sent to spool valve 133 | Command sent to spool valve 133' | Indication of POIL sensor S11 | Indication of POIL sensor S11' |
|---|---|---|---|---|
| All-cylinder deactivation mode | High | High | Low | Low |

When, for example, one of the spool valves 133 and 133' has failed so as to remain in the "High" state (hereinafter referred to as "ON failure") even in a state in which the FIECU 11 sends an "OFF signal" to the spool valve 133 and the spool valve 133' so that the spool valves 133 and 133' are supposed to switch into the "Low state", such a situation may be dealt with in the following manner.

When "ON failure" is detected on the spool valve 133, the FIECU 11 sends an "OFF signal" to the spool valve 133' so as to release the deactivation executing passage 134. Upon receiving the "OFF signal", the spool valve 133' switches into the "OFF" state, and at this time, because operation oil is allowed to flow toward the drain passage 138' due to the check valve 140, operation oil in the deactivation executing passage 134 can be released through the drain passage 138'. As a result, the pins 57a are returned by the pin springs 58, and the deactivation operation is cancelled. Thus, the vehicle can run with the engine E in the all-cylinder activation mode.

On the other hand, when "ON failure" is detected on the spool valve 133', the oil passage, between the check valve 140 and a branching point on the hydraulic control passage 139 at which the spool valve 133' is connected, remains under high pressure; however, due to the check valve 140, the deactivation executing passage 134 is not subjected to high pressure. Accordingly, by switching the spool valve 133 into the "OFF" state so as to apply oil pressure to the deactivation canceling passage 135, operation oil in the deactivation executing passage 134 can be released through the drain passage 138, and thus the vehicle can run with the engine E in the all-cylinder activation mode.

In contrast, when one of the spool valves 133 and 133' has failed so as to remain in the "Low" state (hereinafter referred to as "OFF failure") even in a state in which the FIECU 11 sends an "ON signal" to the spool valve 133 and the spool valve 133' so that the spool valves 133 and 133' are supposed to switch into the "High state", such a situation may be dealt with in the following manner.

When "OFF failure" is detected on the spool valve 133, because the deactivation executing passage 134 is connected to the drain passage 138 regardless of the state of the spool valve 133', the vehicle can run with the engine E in the all-cylinder activation mode.

On the other hand, when "OFF failure" is detected on the spool valve 133', even though oil pressure is applied to the deactivation executing passage 134, operation oil is released to the drain passage 138 through the drain passage 138' of the spool valve 133', and thus the all-cylinder deactivation operation cannot be executed; therefore, the vehicle can run with the engine E in the all-cylinder activation mode.

As explained above, the vehicle can run with the engine E in the all-cylinder activation mode even when any of the spool valves 133 and 133' exhibit "ON failure" or "OFF failure"; however, in order to rapidly deal with failures, the failures must be detected first, which includes pinpointing failed portions. TABLE 3 shows that type of failure and failed portions can be determined based on the switching signals ("High (ON command)" or "Low (OFF command)") from the FIECU 11 and output signals ("High" or "Low") of the POIL sensors S11 ands S11'.

TABLE 3

| Failure mode | Command sent to spool valve 133 | Command sent to spool valve 133' | Indication of POIL sensor S11 | Indication of POIL sensor S11' |
|---|---|---|---|---|
| "ON failure" of spool valve 133 | Low (OFF) | Low (OFF) | Low | Low |
| "ON failure" of spool valve 133' | Low (OFF) | Low (OFF) | High | High |
| "OFF failure" of spool valve 133 | High (ON) | High (ON) | High | Low |
| "OFF failure" of spool valve 133' | High (ON) | High (ON) | Low | Low |

According to TABLE 3, when both the POIL sensors S11 and S11' indicate "Low" pressure despite of the "OFF" commands being sent to the spool valves 133 and 133' so as to make the spool valves 133 and 133' switch into the "Low" state in order to switch the operation mode of the engine E into the all-cylinder activation mode, it is determined that the deactivation canceling passage 135 is connected to the drain passage 38 based on the fact that the POIL sensor S11 indicates "Low" pressure, and also it is determined that the spool valve 133 remains in the "ON" state based on the fact that the POIL sensor S11' indicates "Low" pressure, i.e., it is determined that the failure mode is "ON failure" of the spool valve 133 in which the spool valve 133 remains in the "ON" state.

When both the POIL sensors S11 and S11' indicate "High" pressure despite of the "OFF" commands being sent to the spool valves 133 and 133' so as to make the spool valves 133 and 133' switch into the "Low" state in order to switch the operation mode of the engine E into the all-cylinder activation mode, it is determined that the deactivation canceling passage 135 is supplied with operation oil based on the fact that the POIL sensor S11 indicates "High" pressure, and also it is determined that, even though the deactivation executing passage 134 is connected to the drain passage 138, operation oil under high pressure, which was pressurized upon the previous "ON" command, is confined between the spool valve 133' and the check valve 140 based on the fact that the POIL sensor S11' indicates "High" pressure, i.e., it is determined that the failure mode is "ON failure" of the spool valve 133' in which the spool valve 133' remains in the "ON" state.

When the POIL sensor S11 indicates "High" pressure, and the POIL sensor S11' indicates "Low" pressure despite of the "ON" commands being sent to the spool valves 133 and 133' so as to make the spool valves 133 and 133' switch into the "High" state in order to switch the operation mode of the engine E into the all-cylinder deactivation mode, it is determined that the deactivation canceling passage 135 is supplied with operation oil based on the fact that the POIL sensor S11 indicates "High" pressure, and also it is determined that, even though the drain passage 138' is closed (upon "ON" command to the spool valve 133'), the deactivation executing passage 134 remains under low pressure based on the fact that the POIL sensor S11' indicates "Low"

pressure, i.e., it is determined that the failure mode is "OFF failure" of the spool valve 133 in which the spool valve 133 remains in the "OFF" state.

When both the POIL sensors S11 and S11' indicate "Low" pressure despite of the "ON" commands being sent to the spool valves 133 and 133' so as to make the spool valves 133 and 133' switch into the "High" state in order to switch the operation mode of the engine E into the all-cylinder deactivation mode, it is determined that the deactivation canceling passage 135 is connected to the drain passage 138 based on the fact that the POIL sensor S11 indicates "Low" pressure, and also it is determined that, even though deactivation executing passage 134 is supplied with operation oil, the deactivation executing passage 134 remains under low pressure based on the fact that the POIL sensor S11' indicates "Low" pressure, i.e., it is determined that the failure mode is "OFF failure" of the spool valve 133' in which the spool valve 133' remains in the "OFF" state.

According to the second embodiment, because energy corresponding to the friction in all of the cylinders can be recovered using the motor M by executing the all-cylinder deactivation operation so that an effect of improvement in fuel economy due to the cylinder deactivation operation is maximized, and in addition, the vehicle can run with the engine E in the all-cylinder activation mode without any problems even when any of the spool valves 133 and 133' exhibit "ON failure" or "OFF failure", and thus reliability of the vehicle can be enhanced.

Moreover, it is possible to easily determine whether or not any of the spool valves 133 and 133' have "ON failure" or "OFF failure" (failed or not failed, as well as causes) based on the switching signals from the FIECU 11 and the output signals of the POIL sensors S11 and S11' so that the failures can be rapidly dealt with.

Furthermore, because the back pressure sides of the valve trains are connected to the drain passages 138 and 138' which opens to the atmosphere, the construction of the hydraulic passages can be simplified.

In the second embodiment, the vehicle to which the present invention is applied is a hybrid vehicle which comprises a motor and an engine as power sources, and in which the power of at least one of the engine and the motor is transmitted to an output shaft via a transmission for driving the hybrid vehicle, and, during deceleration, the motor is used as a generator so as to recover regenerated energy to be stored in a battery device; however, the present invention may be applied to a vehicle having a conventional engine.

Advantageous Effects Obtainable by the Invention

As explained above, according to the present invention, it is possible to apply oil pressure to each of the rocker shafts via the hydraulic circuits so as to suspend the operations of the intake and exhaust valves so that all of the cylinders are deactivated when, for example, fuel supply is suspended during deceleration run of the vehicle, while on the other hand, when failure of the hydraulic system is detected by the oil pressure measuring sections, it is also possible to apply oil pressure to the rocker shaft corresponding to the failed hydraulic system via the hydraulic circuits of the normally operating hydraulic system so as to normally operate the intake and exhaust valves combined with the valve trains. Therefore, not only can the engine be operated in the all-cylinder deactivation mode, but also the vehicle can run without any problems even when some of the cylinders or a part of hydraulic system fail.

In addition, according to the present invention, it is possible to apply oil pressure to each of the rocker shafts via the oil pressure control sections so as to suspend the operations of the intake and exhaust valves so that all of the cylinders are deactivated when, for example, fuel supply is suspended during deceleration run of the vehicle, while on the other hand, when one hydraulic system fails, it is also possible to apply oil pressure to the rocker shaft corresponding to the failed hydraulic system via the oil pressure control sections of the normally operating hydraulic system so as to normally operate the intake and exhaust valves combined with the valve trains. Therefore, energy corresponding to the friction in all of the cylinders can be recovered using the motor when the all-cylinder deactivation operation is executed, and in addition, the vehicle can run without any problems even when some of the cylinders or a part of hydraulic system fail.

Moreover, according to the present invention, because it is possible to apply oil pressure to the rocker shafts corresponding to the failed oil pressure control sections using the remaining oil pressure control sections, the vehicle can run without any problems.

Furthermore, according to the present invention, because it is possible to execute a cylinder deactivation operation and to cancel the cylinder deactivation operation while monitoring whether or not the hydraulic systems have failed using the oil pressure sensors, execution and cancellation of the cylinder deactivation operation can be reliably performed.

In addition, according to the present invention, when the operation mode of the valve trains is switched between a normal operation mode, in which oil pressure is applied to the first hydraulic passage by the first oil pressure switching section while the oil pressure in the second hydraulic passage is released so as to, for example, operate the internal combustion engine in an all-cylinder activation mode, and a special operation mode, in which oil pressure is applied to the second hydraulic passage by the first oil pressure switching section while the oil pressure in the first hydraulic passage is released so as to, for example, operate the internal combustion engine in an all-cylinder deactivation mode, it is possible to close the third hydraulic passage by the second oil pressure switching section so as to ensure oil flow from the second hydraulic passage to the valve trains in the special operation mode of the valve trains. Therefore, it is further possible to easily cancel the special operation mode of the valve trains by closing the third hydraulic passage by the second oil pressure switching section and by opening the second hydraulic passage.

In addition, it is possible to detect failures in the first and second oil pressure switching sections in such a manner that the oil pressure in the first hydraulic passage is measured by the first oil pressure sensor, the oil pressure in the third hydraulic passage is measured by the second oil pressure sensor, and switching signals of the first and second oil pressure switching sections are monitored.

Moreover, according to the present invention, it is possible to switch the operation mode of the valve trains between a normal operation mode, in which the first hydraulic passage is connected to the high pressure side by the first oil pressure switching section while the second hydraulic passage is connected to the low pressure side so as to, for example, operate the internal combustion engine in an all-cylinder activation mode, and a special operation mode, in which the second hydraulic passage is connected to the high pressure side by the first oil pressure switching section while the first hydraulic passage is connected to the low pressure side so as to, for example, operate the internal combustion engine in an all-cylinder deactivation mode. In addition, in the special operation mode of the valve trains, because it is also possible to close the third hydraulic passage by the second oil pressure switching section so as to ensure oil flow from the second hydraulic passage to the valve trains, it is further possible to easily cancel the special operation mode of the valve trains by closing the third hydraulic passage by the second oil pressure switching section and by opening the second hydraulic passage.

In addition, according to the present invention, it is possible to detect failures in the hydraulic control device in such a manner that the oil pressure in the first hydraulic passage is measured by the first oil pressure sensor, the oil pressure in the third hydraulic passage is measured by the second oil pressure sensor, and switching signals of the first and second oil pressure switching sections are monitored so as to detect abnormalities in switching operations of the first and second oil pressure switching sections. Therefore, failures can be dealt with in rapid and reliable manner.

According to the present invention, because the low pressure side can be simply configured so as to be open to the atmosphere, the construction of the hydraulic passages can be simplified.

According to the present invention, the operation mode of the engine can be switched between the all-cylinder activation mode and all-cylinder deactivation mode, and in case the operation mode of the engine cannot be switched from the all-cylinder deactivation mode into the all-cylinder activation mode, the oil pressure in the second hydraulic passage can be released by canceling prohibition of oil flow, due to the second oil pressure switching section, in the third hydraulic passage. Therefore, it is possible to greatly improve fuel economy due to the all-cylinder deactivation operation, and while on the other hand, when any abnormalities are detected, the all-cylinder deactivation operation can be rapidly and reliably terminated so as to return to the all-cylinder activation operation.

According to the hydraulic control device configured as described above, failures in the first and second oil pressure switching sections can be detected. In particular, when it is detected that the first oil pressure switching section has failed, and the second hydraulic passage remains pressurized, the special operation of the valve trains can be terminated by canceling prohibition of oil flow in the third hydraulic passage using the second oil pressure switching section. Therefore, whether or not failures exist, and causes of the failures, can be found rapidly.

What is claimed is:

1. A hydraulic control device for valve trains of an engine installed in a hybrid vehicle which comprises a motor in addition to the engine as power sources, and in which the power of at least one of the engine and the motor is transmitted to an output shaft via a transmission for driving the hybrid vehicle, and the engine having cylinders which are optionally deactivated by applying oil pressure to the valve trains so as to suspend the operations of associated intake and exhaust valves, the hydraulic control device comprising:
a plurality of rocker shafts which are arranged in line, and each of which is provided with hydraulic passages therein for applying oil pressure to each of the valve trains so as to activate and deactivate the cylinders; and
oil pressure control sections which are connected to the rocker shafts, respectively, for applying oil pressure to each of the rocker shafts;
wherein the oil pressure control sections are adapted such that when any of the oil pressure control sections fail, the remaining oil pressure control sections apply oil pressure to the rocker shafts corresponding to the failed oil pressure control sections.

2. A hydraulic control device for valve trains according to claim 1, wherein the oil pressure control sections comprise spool valves and oil pressure sensors.

3. A hydraulic control device for valve trains of an internal combustion engine, the hydraulic control device comprising:
a first oil pressure switching section which performs switching operation by receiving switching signal;
a second oil pressure switching section which performs switching operation by receiving switching signal;
a first hydraulic passage for supplying oil pressure from the first oil pressure switching section to the valve trains;
a first oil pressure sensor for measuring oil pressure in the first hydraulic passage;
a second hydraulic passage for supplying oil pressure from the first oil pressure switching section to the valve trains;
a third hydraulic passage, which branches off the second hydraulic passage, for supplying oil pressure to the second oil pressure switching section;
a second oil pressure sensor for measuring oil pressure in the third hydraulic passage; and
a check valve, which is provided in the third hydraulic passage, for prohibiting oil flow from the second oil pressure switching section to the valve trains.

4. A hydraulic control device for valve trains of an internal combustion engine, the hydraulic control device comprising:
a first oil pressure passage for making the valve trains operate in a normal manner;
a second oil pressure passage for making the valve trains operate in a special manner;
a first oil pressure switching section which is adapted to connect the first hydraulic passage to a high pressure side while connecting the second hydraulic passage to a low pressure side when the valve trains operate in the normal manner, and to connect the second hydraulic passage to the high pressure side while connecting the first hydraulic passage to the low pressure side when the valve trains operate in the special manner;
a third hydraulic passage branching off the second hydraulic passage;
a second oil pressure switching section, which is connected to the third hydraulic passage, for prohibiting oil flow in the third hydraulic passage when the second hydraulic passage is connected to the high pressure side by the first oil pressure switching section; and
a check valve, which is provided in the third hydraulic passage, for prohibiting oil flow from the second oil pressure switching section to the valve trains.

5. A hydraulic control device for valve trains according to claim 4, further comprising:
a first oil pressure sensor, which is provided to the first hydraulic passage, for measuring oil pressure therein; and
a second oil pressure sensor, which is provided to an hydraulic passage between the check valve provided in the third hydraulic passage and the second oil pressure switching section, for measuring oil pressure in the hydraulic passage.

6. A hydraulic control device for a valve train according to claim 4, wherein the low pressure side is connected to a drain passage.

7. A hydraulic control device for valve trains according to claim 4, wherein an all-cylinder operation of the internal combustion engine is executed, in which all cylinders thereof are activated by operating associated intake and exhaust valves, when the valve trains operate in the normal manner, and an all-cylinder deactivation operation of the internal combustion engine is executed, in which all cylinders thereof are deactivated by suspending operations of the intake and exhaust valves when the valve trains operate in the special manner.

8. A hydraulic control device for valve trains according to claim 5, further comprising a control section for respectively switching the first oil pressure switching section and the second oil pressure switching section, wherein failed state of the first oil pressure switching section or of the second oil pressure switching section is determined based on switching signals being sent from the control section to the first oil pressure switching section and to the second oil pressure switching section, as well as based on the output signals of the first oil pressure sensor and the second oil pressure sensor.

* * * * *